Sept. 18, 1962 J. BUCHSTEINER 3,054,186
WRIST JOINT ASSEMBLY FOR DENTAL PURPOSES
Filed Aug. 28, 1958 2 Sheets-Sheet 1

INVENTOR.
BY Josef Buchsteiner

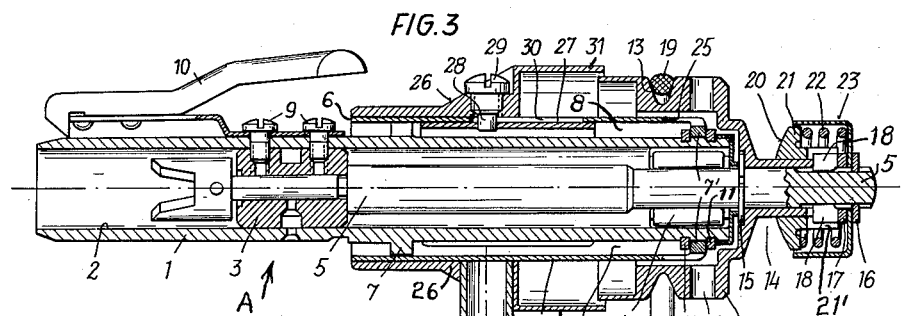
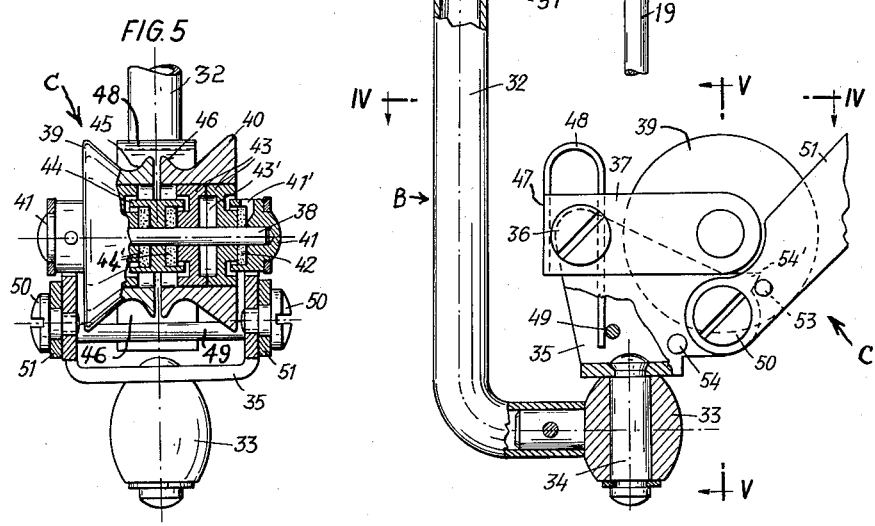
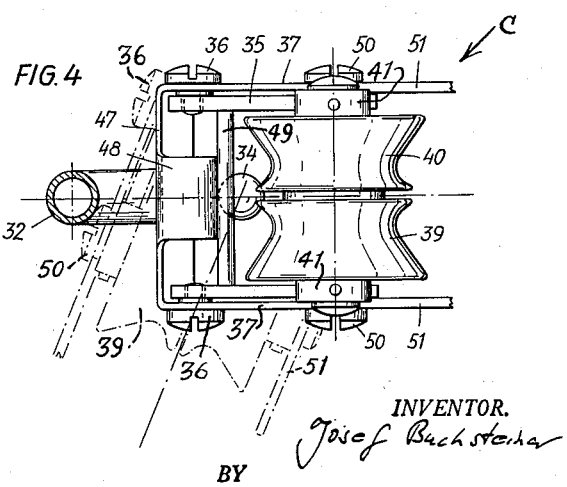

3,054,186
WRIST JOINT ASSEMBLY FOR
DENTAL PURPOSES
Josef Buchsteiner, Salzburg, Austria, assignor to Dentalwerk Burmoos Ges. m.b.H., Burmoos, Salzburg, Austria, a firm
Filed Aug. 28, 1958, Ser. No. 757,845
Claims priority, application Austria Sept. 6, 1957
19 Claims. (Cl. 32—23)

A wrist joint assembly for dental machines has already been proposed, in which the drive spindle for the tool carries a grooved pulley having two V-shaped grooves of different diameter, to which the driving belt can be selectively applied. The driving belt, however, reaches the pulley in an oblique direction at least in one of its driving positions, which causes irregular drive and rapid wear of the driving belt.

Moreover, reducers have been proposed comprising grooved pulleys and being provided between the driving pulleys of the tool shaft and the motor, mounted either on the wrist joint or on the linkage for guiding the belt to the motor. This necessitates two belts and requires a more complicated power transmission as well as a heavier and bulkier construction of the joint, and also involves the additional disadvantage that the pulleys at the joint rotate at higher speed and are, therefore, under a higher stress. Moreover, the substantially shortened driving belt between the stepped pulley and the grooved pulleys of the wrist joint runs at a higher peripheral velocity and is thus subjected to higher stresses.

According to another proposal the usual grooved pulley for driving the tool shaft is slidably mounted on the hub of a grooved pulley this is smaller in diameter, which hub can be moved to its operative position by means of the smaller grooved pulley. The driving connection between the pulleys in the direction of rotation is effected by a grub screw (headless screw) mounted in the hub of the larger pulley; this screw has a pinlike end engaging an axial groove in the hub of the smaller pulley. The length of said groove determines the two end positions of the larger pulley. In this construction the drive is restricted to two stages.

Finally, a wrist joint for high-speed operation has been disclosed, in which the bearing bushing together with the driving shaft and the grooved pulley affixed thereto can be screwed into a sheath of the hand piece. The provision of grooved pulleys of different sizes on the driving shaft enables a variation of the speed of said shaft and of the tools connected thereto. The changeover from one speed to another requires a loosening of the grooved pulley that can only be effected with the aid of a tool.

This invention relates to a wrist joint assembly for dental machines, comprising a grooved pulley having the form of a stepped pulley that is affixed on the tool driving shaft laterally of its bearing bushing. It is the object of the invention to provide a wrist joint type of power transmission which enables tools to be driven at high speeds and which will withstand the stresses occurring during operation at such speeds.

The invention resides essentially in that the supporting arm for the hinge carrying the joint pulleys, which supporting arm is loosely swingable around the bearing bushing in the usual manner, is so arranged on the bearing bushing that it is slidable, self-locking and can be fixed in position thereon. The supporting arm consists preferably of a bearing head and a rod affixed thereto and angled at its free end, where it has a trunnion eye for the joint disposed between said trunnion and the grooved pulley; the trunnion extending at right angles to the driving spindle, as usual, and, the driving belt running from the hinge pulleys approximately in the plane of the respective V-shaped groove of the grooved pulley when the supporting arm is appropriately positioned. This construction enables the use of a stepped pulley having three or even more grooves, if desired, so that the tool speeds can be matched more exactly to the drive requirements.

The slidable arrangement of the supporting arm with the hinge pulleys causes the driving belt to run from the hinge pulleys to the V-shaped groove of the grooved pulley of the stepped pulley at any time in a plane extending at right angles to the driving shaft so that any obliquity, which would cause irregular drive of the tool and rapid wear of the belt, is avoided. The chafing of the driving belt on the hinge sleeve of the hinge, which occurs with the usual wrist joint assemblies when the belt is tight, is entirely avoided with this construction.

The invention is further directed to structural developments which effect a ventilation of the drive shaft bearings of the wrist joint assembly or of a Doriot handpiece connected thereto. This ventilation may even be extended to fitted-on elements. A special mounting of the member which connects the hinge to the bearing sleeve of the drive shaft provides for the stepped pulley having V-shaped grooves largest in diameter protection by a flowing air shield when the drive shaft is driven at the highest speed. The tensioning mechanism for the driving belt is also significantly improved.

An illustrative embodiment of the invention is shown in the drawing in which

FIG. 3 is a sectional view of the wrist joint assembly at a slightly larger scale:

FIG. 4 is a top plan plan view of the joint taken on line IV—IV of FIG. 3; and

FIG. 5 is a partly elevational sectional rear view of the joint taken on line V—V of FIG. 3.

Figure 2:
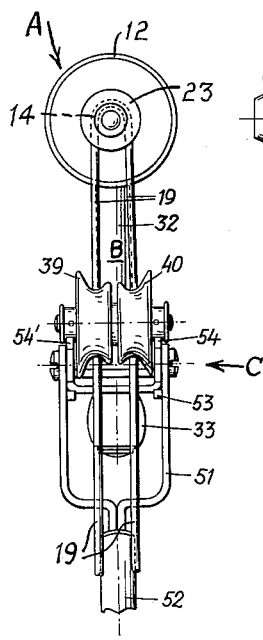
FIG. 2 is a rear view thereof.
Figure 1:
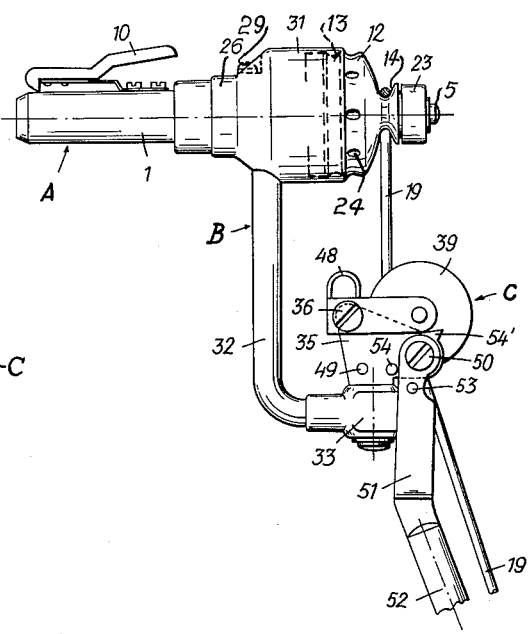
FIG. 1 is a side elevation of the wrist joint assembly.

As is apparent from FIGS. 1 and 3, the wrist joint assembly according to the invention comprises as its main components the bearing unit A for the tool driving spindle, the supporting arm B and the joint C (FIG. 1).

The bearing unit A consists of a bearing sleeve 1 which has in its bore 2 bearings 3 and 4 for a drive spindle 5 and is supported with collars 7, 7' in a cylindrical shell 6 to provide an air gap 8 between the bearing sleeve 1 and the shell 6. The bearing 3 is connected in a known manner by screws 9 to the bearing sleeve 1, together with a depressable member 10 which serves for retaining the handpiece (not shown). The collar 7' is laterally embraced by two snap rings 11 which are fitted in annular grooves of the bearing sleeve 1 so as to hold the shell 6 against axial displacement. A grooved pulley 12 having the shape of a stepped pulley is affixed laterally of the bearing sleeve 1 on the free end of the driving spindle 5.

In the embodiment shown this pulley has two V-shaped grooves 13, 14. The grooved pulley 12 is held against axial displacement by two snap rings 15, 16 and is connected to the driving spindle 5 for rotation therewith by a driver ring 17 forced on the driving spindle 5 and provided with two diametrically opposite lugs 18 engaging corresponding longitudinal slots 21' in the hub of the grooved pulley 12. In the groove 13 of large diameter a driving belt 19 causes the grooved pulley 12 to be entrained in the usual manner by a motor (not shown) owing to the frictional effect exercized in dependence on the belt tension between the wedge-shaped cambered side faces of the groove and the belt.

When power is transmitted in this manner to the grooved pulley, the V-shaped groove must be narrower at its bottom than would correspond to the diameter of the belt, in order to prevent slippage of the driving belt at higher torques required in the lower speed range. This usual shape of the groove, shown in FIG. 3, has, however, the disadvantage that in the case of a sudden overload, e.g., when the hand instrument is blocked for a short time, a strong instantaneous pull is carried over by the belt from the driving to the driven grooved pulleys, whereby the instrument may even be pulled out of the hand of the operator. This is particularly so when the strong wedging of the driving belt in the groove of the motor driving spindle results in the outgoing portion of the driving belt moving out of the groove and being wound up around the motor shaft. This danger increases with increasing speed. For this reason additional safety means must be provided for high-speed transmissions.

The smaller diameter groove 14 provided for high speed transmission is therefore of special construction, one wall 20 being formed as a bush 21 slidable in the axial direction of the driving spindle 5 and biased by one end of a coil spring 22 in the direction in which it effects a construction of the V-shaped groove section 14; the bush 21 is axially movable along the driving spindle 5 by the cooperation of the lugs 18 in the slots 21' formed in the hub of bush 21. The coil spring 22 bears with its other end on a protective cap 23 engaging the snap ring 16 and embracing the outer rim of the bush 21. Beside the larger V-shaped groove 13, the grooved pulley 12 has a cylindrical extension formed with radial bores 24 or the like, which open slightly beyond the end of the cylindrical shell 6, the latter being provided in that area with several peripheral openings in the form of slots 25.

The supporting arm B, which is swingable about the bearing unit A in the usual manner, has a bearing head 26 with which it is mounted on the shell 6 so as to be slidable and self-locking therealong and arranged to be fixed in position (by means not shown). To this end the shell 6 contains an outwardly resilient, longitudinally slotted elastic sleeve 27 which receives a pin extension 28 of a screw 29 attached to the bearing head 26. This extension 28 also passes through a longitudinal slot 30 of the shell 6. The sleeve 27 is long enough to cover the slot 30 determining the end positions of the bearing head 26 on the shell 6 in any position of the sleeve. The bearing head 26 has a sleeve-shaped extension 31 which embraces the grooved pulley 12 with some play and is so long that it may be shifted so as to cover the V-shaped groove 13 in the position shown in FIG. 1 when the driving belt 19 lies in the smaller V-shaped groove 14.

The bearing head 26 has affixed thereto a rod 32 which is angled at its other end and carries thereon a bearing eye 33 for a trunnion 34 of the joint C. This trunnion extends in the usual manner at right angles to the driving spindle 5 and its axis lies approximately in the central plane of one of the V-shaped grooves 13 or 14 of the pulley 12, depending on the position of the bearing pin 26 relative to the shell 6 or the driving spindle 5.

The joint C, shown in detail in FIGS. 4 and 5, consists of a bail 35 which carries the trunnion 34, and of a spring bail 37 which is swingable transversely to the bail 35 about screws 36; on the free ends of bail 37 a bearing pin 38 is supported with two joint pulleys 39, 40. For this purpose the ends of the bearing pin 38 have bearing caps 41 fitted thereon which are held by the limb ends of the spring bail 37, tending to move resiliently towards each other. The bearing caps 41 are urged against felt rings 43 of the joint pulleys 39, 40—these discs form oil chambers 43'—and urge the joint pulleys against a central annular spacer 44 having lateral felt rings 44'. The bearing caps 41 have lubricating holes 41' through which oil can be supplied to the felt rings 42 for lubrication. The configuration of the bearing caps 41, the bearing discs 43 and the spacer ring 44 provide a labyrinth type seal for the lubricating oil so as to ensure a very economical oil consumption and to avoid re-lubrication except at very long time intervals.

The joint pulleys 39, 40 have both grooves 45 which are deeper on their adjacent sides where they have rims 46 smaller in diameter than on the sides facing away from each other. The spring bail 37 carries at its web 47 a leaf spring 48 which is bent toward the trunnion 34 and the free end of which engages a pin 49 connecting the limbs of the bail 35 so that the joint pulleys 39, 40 are urged towards the trunnion 34. Below the bearing pin 38 fork ends 51 of a swivel arm 52 are rotatably mounted on the limbs of the bail 35 by means of the shanks of extended screws 50. The range of pivotal movement of fork ends 51 is limited by stop pins 53, 54 which are affixed to the fork ends 51 of the arm 52 and to the limbs of the bail 35, respectively. The engaging pins 53 coact with extensions 54' of the bail limbs whereas the engaging pins 54 prevent a rotation of the swivel arm 52 beyond its position shown in FIG. 1. The range of pivotal movement of the bail 35 about the trunnion 34 is limited by the engagement of the heads of the screws 50 with rod 32 of the supporting arm B, as is indicated in dash and dot lines in FIG. 4.

The wrist joint assembly according to the invention enables a rapid shifting of the driving belt from one V-shaped groove into the other and permits also of a modification in construction by providing three or more appropriately graded grooves instead of two. A corresponding displacement of the bearing head 26 will cause the joint pulleys 39 and 40 to stand opposite the appropriate V-shaped groove in such a manner that the driving belt runs off approximately parallel thereto.

The rotation of the grooved pulley 12 causes air to be sucked through the bores 24 into the cylindrical air gap 8 to flow along the bearing 3 through transverse grooves in the collar 7 and along the bearing 4 through the slots 25 effecting an efficient cooling to dissipate the heat from the bearings, particularly during operation at high speed. The flowing air shield may extend to appropriately constructed handpieces and angle pieces and may be particularly useful where Doriot handpieces are connected because a small air gap opening into the gap 8 is left between the handle sleeve of the handpiece and the bearing sleeve of the tool driving shaft.

The special construction of the V-shaped high speed groove 14, owing to the yield of one of its side faces by the provision of bush 21 axially movable against the force of spring 22, affords special advantages over known high-speed transmissions. Owing to its tension the belt 19 will urge the bush 21 against the spring, enabling the belt to lie at the bottom of the groove so that the smallest wrap diameter can be utilized, increasing thereby speed. Moreover, the pressure applied by the spring-loaded bush on the belt cross-section will determine the torque that can be transmitted, in the case of an overload a shock-free transition to the slipping of the driving belt occurs so that the grooved pulley forms at the same time a safety coupling.

Another advantage of the spring-loaded V-shaped groove resides in that variations in thickness and hardness of the driving belt can no longer cause the same to rise and descend in radial direction of the V-shaped groove, resulting in vibrations in the driving mechanism, because such variations are compensated by the axial yield of the bush 21, any vibrations of the bush which may occur being so small that they are not noticed at all. The yielding construction of the V-shaped groove may also be adopted for the larger V-shaped groove or grooves, if desired.

The driving belt is particularly protected by the special construction of the supporting arm B, the angled rod 32 and of the trunnion 34 for the joint C between the latter and the grooved pulley 12 because the chafing of the driving belt 19, which frequently occurs in the usual wrist joint assemblies, is entirely avoided, the driving belt running now freely between the joint pulleys 39, 40 and the grooved pulley 12. The special bearing arrangement for the joint pulleys 39, 40 enables the parts to be disassembled without using a tool. The pulleys are automatically lubricated by the felt discs 42, 44' owing to the provision of the oil chamber 43' within the bearing discs 43 so that very low oil consumption is achieved. In view of the spring-loaded pivoted arrangement of the joint pulleys 39, 40 only one pivot is required rather than the usual two for tilting the joint relative to the linkage because the shortening of the belt upon tilting of the joint C is compensated by the resilient bails. The joint pulleys may be journaled in ball bearings.

What is claimed is:

1. A wrist joint assembly for dental machines, comprising a bearing sleeve, a tool driving spindle rotatably carried in said sleeve and having a front end adapted to have a tool affixed thereto and a rear end protruding out of said sleeve, a stepped pulley non-rotatably carried by said rear end of said spindle and having at least two axially spaced peripheral grooves different in diameter, a supporting arm pivotally and slidably connected to said sleeve and comprising a bearing head connected to said sleeve and a rod having one end affixed to said head and another angled end formed with a bearing eye, a joint carried by said arm and comprising a trunnion rotatably mounted in said eye, two joint pulleys carried by said joint at a location between said joint and said stepped pulley, said pulleys being selectively engageable by a belt adapted to connect said stepped pulley with any of said grooves thereof and has two strands adapted to run around one of said pulleys, said arm being slidable along said sleeve defining positions in which said pulleys are substantially juxtaposed to the one of said grooves which is connected by means of said belt strands to said pulleys, and locking means for selectively securing said arm on said sleeve in any one of said positions, said arm being adapted to be adjusted to one of said positions in which it causes said belt to run from said pulleys in the direction toward said stepped pulley substantially in the plane of said grooves engaged by said belt.

2. A wrist joint assembly as set forth in claim 1, comprising a cylindrical shell surrounding said sleeve and surrounded by said head with a clearance, a longitudinally slotted spring sleeve which tends to move resiliently outwardly and is in sliding engagement with the inside of said shell, and wherein said locking means comprises members for connecting said head to said spring sleeve, whereby said head is slidingly and self-lockingly connected to said shell.

3. A wrist joint assembly as set forth in claim 2, in which said locking means comprises a screw and said shell is formed with a longitudinal slot through which said screw extends and limits the extreme positions of said head.

4. A wrist joint assembly as set forth in claim 1, in which the larger one of said peripheral grooves is nearer to said sleeve than the other grooves and in which said head carries a sleve-like extension arranged to cover said larger groove when said supporting arm is in a position in which it causes said belt to run from said pulleys in the direction toward said stepped pulley substantially in the plane of the smaller one of said grooves.

5. A wrist joint assembly as set forth in claim 1, in which said stepped pulley is formed with radial openings which open slightly below the end of said shell, and said shell is formed with several passage openings adjacent to said radial openings.

6. A wrist joint assembly as set forth in claim 1, in which said joint comprises a trunnion bail mounted on said trunnion, a spring bail pivoted to said trunnion bail on an axis transverse to said trunnion, said spring bail comprising two limbs having free ends, a bearing pin carried by said free ends, said bearing pin carrying said pulleys, spring means tending to urge said spring bail and said joint pulleys carried thereby through the intermediary of said bearing pin towards said trunnion against the pull exerted on said pulleys by said belt when in engagement therewith, and a swivel arm having a forked end pivotally connected to said trunnion bail and arranged to limit the pivotal movement of said spring bail.

7. A wrist joint assembly as set forth in claim 6, comprising bearing discs carried by said bearing pin, forming parts of said pulleys and defining oil chambers, felt rings engaging the axially outer end faces of said bearing discs, and bearing caps fitted on said bearing pin and engaged by said free ends of said limbs to urge said felt rings against said bearing discs.

8. A wrist joint assembly as set forth in claim 6, in which said spring bail comprises a web connecting said two limbs and said trunnion bail comprises two limbs, which comprises a pin connecting said two limbs of said trunnion bail, and in which said spring means comprise a leaf spring affixed to said web, and is bent towards said trunnion and has a free end engaging said pin.

9. A wrist joint assembly as set forth in claim 6, comprising screws carried by said trunnion bail and having extension pins defining an axis below said bearing pin, said forked end being pivotally mounted on said extension pins and carrying stop pins arranged to limit the pivotal movement of said swivel arm relative to said trunnion bail, said screws being arranged to engage said supporting arm to limit the pivotal movement of said trunnion bail around said trunnion.

10. A wrist joint assembly as set forth in claim 1, in which said pulleys have peripheral grooves deeper on the adjacent side and defined on both sides by flange portions smaller in diameter on said adjacent side than on the opposite side.

11. A wrist joint assembly as set forth in claim 1, in which said stepped pulley comprises a bush non-rotatably and axially slidably carried by said spindle and defining one side of one of said grooves, and spring means arranged to urge said bush toward the other side of said one groove.

12. A wrist joint assembly as set forth in claim 11, in which said bush is arranged to define one side of one of said grooves which is smaller in diameter.

13. A bearing unit for a wrist joint assembly for dental machines, comprising a bearing sleeve, a tool spindle rotatably carried by said sleeve and having a front end adapted to have a tool affixed thereto and a rear end protruding out of said sleeve, a grooved stepped pulley non-rotatably carried by said rear end of said spindle, and a cylindrical shell surrounding said bearing sleeve with a clearance, said stepped pulley being formed with radial openings which open slightly below the end of said cylindrical shell, and said shell being formed with several passage openings adjacent to said radial openings.

14. A wrist joint for dental machines, comprising a trunnion, a trunnion bail pivotally mounted on said trunnion, a spring bail pivoted to said trunnion bail on an axis transverse to said trunnion, said spring bail comprising two limbs having free ends, a bearing pin carried by said free ends, two joint pulleys carried by said bearing pin, and spring means tending to urge said spring bail and said joint pulleys carried thereby through the intermediary of said bearing pin towards said trunnion.

15. A wrist joint as set forth in claim 14, comprising bearing discs carried by said bearing pin, forming parts of said joint pulleys and defining oil chambers, felt rings engaging the axially outer end faces of said bearing discs, and bearing caps fitted on said bearing pin and engaged by said free ends of said limbs to urge said felt rings against said bearing discs.

16. A wrist joint as set forth in claim 14, in which said spring bail comprises a web connecting said two limbs and said trunnion bail comprises two limbs, which comprises a pin connecting said two limbs of said trunnion bail, and in which said spring means comprise a leaf spring affixed to said web, and is bent towards said trunnion and has a free end engaging said pin.

17. A wrist joint for dental machines, comprising a trunnion, a trunnion bail pivotally mounted on said trunnion, a spring bail pivoted to said trunnion bail on an axis transverse to said trunnion, said spring bail comprising two limbs having free ends, a bearing pin carried by said free ends, two joint pulleys coaxially carried by said bearing pin, said pulleys having peripheral grooves deeper on the adjacent side and defined on both sides by flange portions smaller in diameter on said adjacent side than on the opposite side.

18. A bearing unit for a wrist joint assembly for dental machines, comprising a bearing sleeve, a tool spindle rotatably carried by said sleeve and having a front end adapted to have a tool affixed thereto and a rear end protruding out of said sleeve, a pulley non-rotatably carried by said rear end of said spindle and having at least one peripheral groove, said pulley comprising a bush non-rotatably and axially slidably carried by said spindle and defining one side of one of said grooves, and spring means arranged to urge said bush toward the other side of said one groove.

19. A bearing unit as set forth in claim 18, in which said pulley has two axially spaced peripheral grooves different in diameter and said bush is arranged to define one side of one of said grooves which is smaller in diameter.

References Cited in the file of this patent
UNITED STATES PATENTS

| | | |
|---|---|---|
| 1,204,800 | Lyon | Nov. 14, 1916 |
| 2,529,824 | Staunt | Nov. 14, 1950 |

FOREIGN PATENTS

| | | |
|---|---|---|
| 741,273 | Great Britain | Nov. 30, 1955 |